(12) United States Patent
Shin et al.

(10) Patent No.: US 11,667,378 B2
(45) Date of Patent: Jun. 6, 2023

(54) FLAP DRIVE DEVICE AND BLADES OF ROTARY-WING AIRCRAFT

(71) Applicant: SEOUL NATIONAL UNIVERSITY R&DB FOUNDATION, Seoul (KR)

(72) Inventors: Sang Joon Shin, Seoul (KR); Won Jong Eun, Gyeonggi-do (KR); Byeong Uk Im, Seoul (KR); Chang Bae Lee, Seoul (KR); Jin Wook Shin, Chungcheongbuk-do (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 17/327,348

(22) Filed: May 21, 2021

(65) Prior Publication Data

US 2022/0024570 A1    Jan. 27, 2022

(30) Foreign Application Priority Data

May 22, 2020   (KR) ........................ 10-2020-0061927

(51) Int. Cl.
   *B64C 27/72*   (2006.01)
   *B64C 27/615*  (2006.01)

(52) U.S. Cl.
   CPC ............ *B64C 27/72* (2013.01); *B64C 27/615* (2013.01); *B64C 2027/7283* (2013.01); *B64C 2027/7294* (2013.01)

(58) Field of Classification Search
   CPC .................. B64C 27/72; B64C 27/615; B64C 2027/7261; B64C 2027/7266; B64C 2027/7283; B64C 2027/7294
   See application file for complete search history.

(56) References Cited

U.S. PATENT DOCUMENTS

| | | | |
|---|---|---|---|
| 5,639,215 A | 6/1997 | Yamakawa et al. | |
| 6,135,713 A | 10/2000 | Domzalski et al. | |
| 6,231,013 B1 * | 5/2001 | Jaenker ................ | B64C 27/001 60/528 |
| 9,415,868 B2 | 8/2016 | Pfaller et al. | |
| 2002/0141867 A1 | 10/2002 | Preissler | |

FOREIGN PATENT DOCUMENTS

| | | | | |
|---|---|---|---|---|
| EP | 1035015 A2 | 9/2000 | | |
| EP | 1095850 A2 * | 5/2001 | ........... | B64C 27/615 |
| JP | 2001058600 A | 3/2001 | | |
| KR | 10-2014-0104356 A | 8/2014 | | |

* cited by examiner

*Primary Examiner* — Richard A Edgar
(74) *Attorney, Agent, or Firm* — Fitch, Even, Tabin & Flannery LLP

(57) ABSTRACT

Provided are a flap drive device and a rotorcraft blade, and more particularly, a flap drive device using a two-section link mechanism, which may be applied to a rotorcraft blade, and a rotorcraft blade including the same.

4 Claims, 7 Drawing Sheets

FLAP DRIVE DEVICE AND BLADES OF ROTARY-WING AIRCRAFT

CROSS-REFERENCE TO RELATED APPLICATION

This application is based on and claims priority under 35 U.S.C. § 119 to Korean Patent Application No. 10-2020-0061927, filed on May 22, 2020, in the Korean Intellectual Property Office, the disclosure of which is incorporated by reference herein in its entirety.

BACKGROUND

1. Field

One or more embodiments relate to a flap drive device and a rotorcraft blade, and more particularly, to a flap drive device using a two-section link mechanism, which may be applied to a rotorcraft blade, and a rotorcraft blade including the same.

2. Description of the Related Art

An active trailing-edge flap of a general rotorcraft blade has been utilized in consideration of the fact that vibration corresponding to an integer multiple of the number of blades generated during the operation of the rotorcraft occurs in a rotating shaft. In more detail, the active trailing-edge flap of the rotorcraft blade has been utilized to reduce a vibration load on the rotating shaft by changing a pneumatic force of the blade.

To achieve this effect, the trailing-edge flap needs to be driven at an integer multiple of the number of blade revolutions.

As a device for driving the existing active trailing-edge flap, an actuator using a piezoelectric material having a wide bandwidth and a large dynamic actuation force and a power transmission device (texture) having a flexible property have been used. The actuator has been used to generate a required flap displacement profile, and the power transmission device has been used to amplify a relatively small actuator stroke.

In addition, a brushless direct current (BLDC) motor that converts rotational motion into translational motion has also been used.

However, a piezoelectric material trailing-edge flap actuator mechanism mounted on the existing similar model prototype blade and an actual size blade has a problem in that the position change output decreases under aerodynamic load conditions and has low durability.

For example, in Patent document 10-2014-0017484, two piezoelectric actuators are used to drive one flap, and each piezoelectric actuator is directly connected to the flap by a flexible power transmission device.

In another example, in Patent document US2002-141867A1, an actuator is connected to a trailing-edge flap by two struts, and the struts are located in a plane on which the flap lies.

In another example, in Patent document EP1035015A2, an actuator is connected to four flexible plate devices to amplify the position change, and the position change is amplified due to the contraction and expansion of these devices.

The above examples have a problem in that a change in the operating performance is directly caused by the elasticity maintenance durability of a flexible power transmission device.

Accordingly, there is a need for a flap drive device having a mechanism capable of maintaining the operating performance regardless of durability and amplifying the stroke of a small actuator.

PRIOR ART DOCUMENTS

Patent document 10-2014-0017484

SUMMARY

One or more embodiments include a flap drive device in which a change range in a pitch movement angle of a flap body is enlarged by amplifying an output of an actuator using a two-section link mechanism.

One or more embodiments include a flap drive device that enables a trailing-edge flap provided on a rotating blade to operate according to a target displacement profile in the presence of aerodynamic drag and centrifugal force.

Additional aspects will be set forth in part in the description which follows and, in part, will be apparent from the description, or may be learned by practice of the presented embodiments of the disclosure.

According to one or more embodiments, a flap drive device includes: a drive module; a flap drive link arm arranged behind the drive module and extending by a certain length in a front-rear direction; and a flap module arranged behind the flap drive link arm, wherein the flap module performs pitch movement around a rotation center axis, the drive module includes an actuator shaft capable of changing a position thereof in a front-rear direction, a front end of the flap drive link arm is pivotably connected to the actuator shaft, a rear end of the flap drive link arm is pivotably connected to the flap module, and when a position of the actuator shaft changes in the front-rear direction, the flap module performs pitch movement around the rotation center axis.

According to an embodiment, the flap drive link arm may include a front hinge connection portion provided at the front end, and a rear hinge connection portion provided at the rear end, wherein the front hinge connection portion may be hinge-connected to the actuator shaft, and the rear hinge connection portion may be hinge-connected to the flap module.

According to an embodiment, the flap module may include a flap body, a rotation center hinge segment at a front end of the flap body, and a flap pivot hinge segment at the front end of the flap body, wherein the rotation center hinge segment may connect a rotorcraft blade to the flap body, the flap pivot hinge segment may hinge-connect the rear end hinge connection portion of the flap drive link arm to the flap drive link arm, the rotation center hinge segment may have a first hinge axis on the rotation center axis of the flap module, the flap pivot hinge segment may have a second hinge axis, and a center of the first hinge axis and a center of the second hinge axis are apart from each other by a certain distance.

According to an embodiment, the first hinge axis may be at a position on a chord line of the flap body, and the second hinge axis may be at a center of a span of the flap body.

According to an embodiment, the second hinge axis may be on a line perpendicular to the chord line, and the second hinge axis may be located to be apart from the first hinge axis by a certain distance.

According to an embodiment, a rotorcraft blade may further include a blade body provided with the flap drive device.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
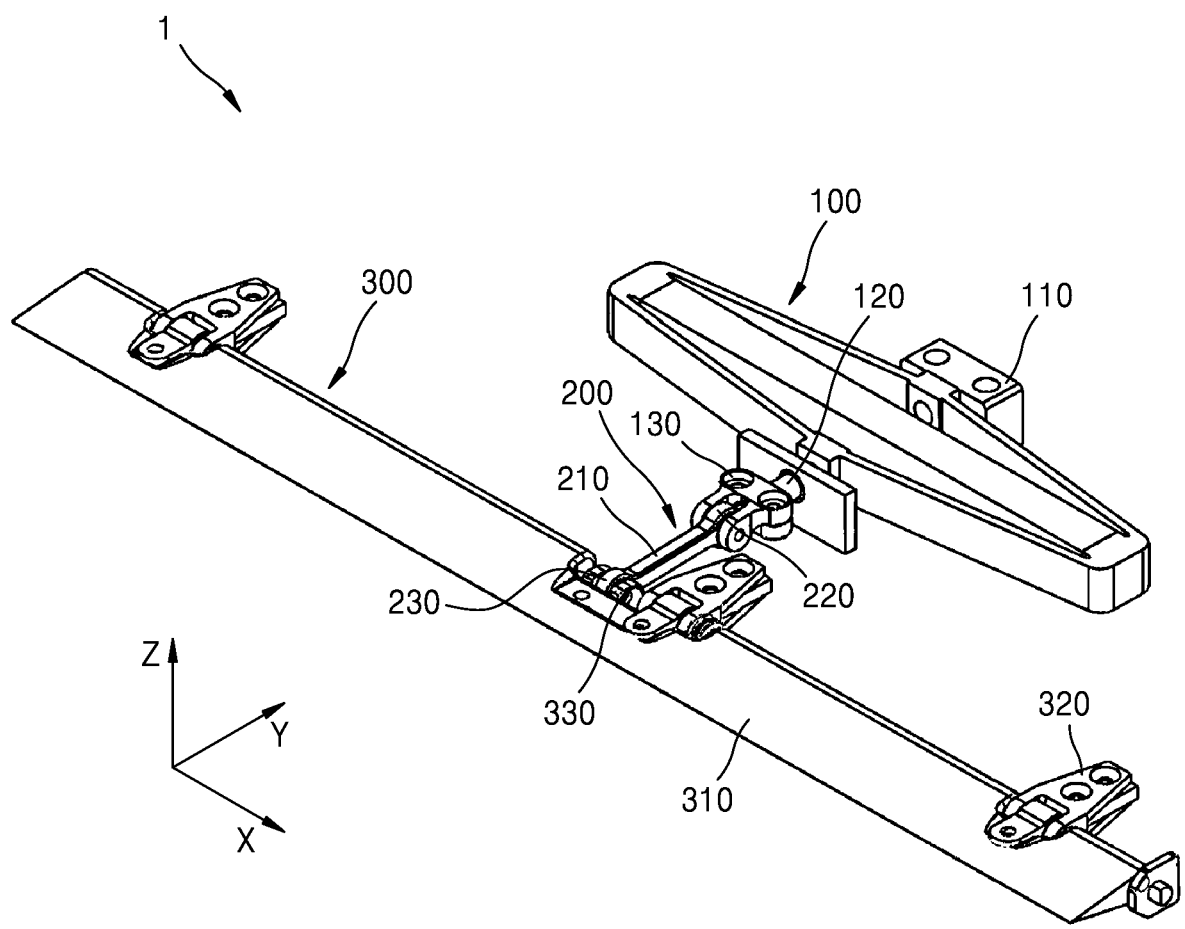
FIG. 1 is a view of a structure of a flap drive device according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, the disclosure will be described in detail with reference to the accompanying drawings.

Figure 2:
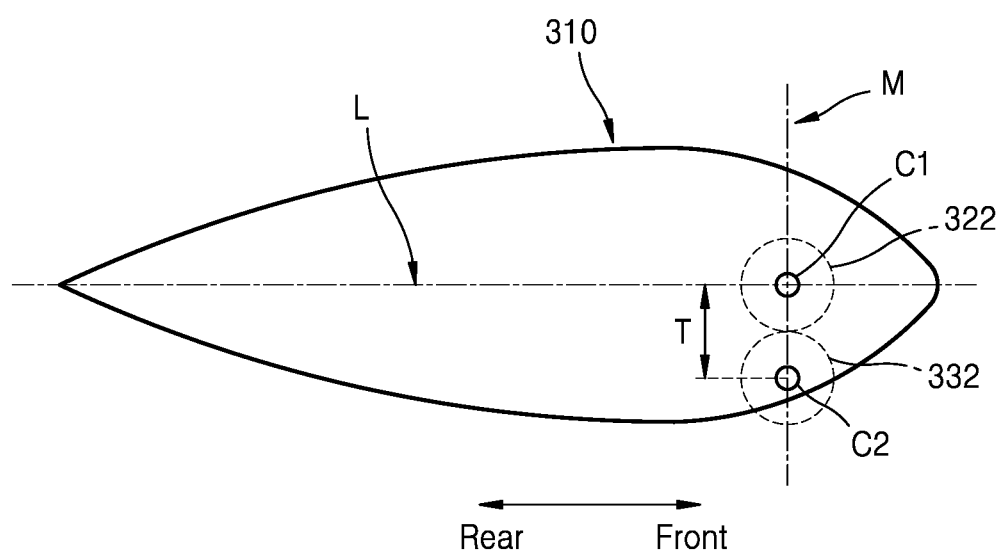
FIG. 2 is a conceptual diagram of a cross-sectional structure of a flap body of a flap drive device in an X-axis direction, according to an embodiment.

FIG. 1 is a view of a structure of a flap drive device 1 according to an embodiment. FIG. 2 is a conceptual diagram of a cross-sectional structure of a flap body 310 of the flap drive device 1 in an X-axis direction, according to an embodiment.

Hereinafter, "left-right", "front-rear", and "up-down" denoting directions mean the X-axis, Y-axis, and Z-axis of FIG. 1, respectively. In addition, the term "pitch movement" is defined as motion rotating around the X-axis (or the axis parallel to the X-axis) of FIG.

The flap drive device 1 according to an embodiment may include a drive module 100, a flap drive link arm 200, and a flap module 300.

<Drive Module 100>

The drive module 100 may be any device that generates power. The drive module 100 may include an actuator 110 and an actuator shaft 120 that changes in position by the actuator 110.

For example, the actuator 110 may be configured as a piezoelectric actuator. However, the disclosure is not limited thereto.

The actuator shaft 120 may change its position in the front-rear direction (Y-axis direction) by the actuator 110.

A hinge connection segment 130 capable of being hinge-connected to a front hinge connection portion 220 of the flap drive link arm 200 to be described later below may be provided at a rear end of the actuator shaft 120.

<Flap Drive Link Arm 200>

The flap drive link arm 200 may include a link body 210, and the front hinge connection portion 220 and a rear hinge connection portion 230 provided at front and rear ends of the link body 210, respectively.

The link body 210 may be configured as a bar-shaped link arm extending a certain length in the front-rear direction (Y-axis direction).

The front hinge connection 220 is at a front end of the flap drive link arm 200. The front hinge connection 220 is hinge-connected to the hinge connection segment 130 of the actuator shaft 120. Accordingly, the flap drive link arm 200 may pivot around the front hinge connection portion 220.

The rear hinge connection portion 230 may be at a rear end of the flap drive link arm 200. The rear hinge connection portion 230 may be hinge-connected to the flap module 300 through the flap pivot hinge segment 330 to be described later below.

<Flap Module 300>

The flap module 300 may include the flap body 310, a rotation center hinge segment 320, and the flap pivot hinge segment 330.

The flap body 310 may have a constant airfoil shape in a span direction.

The flap body 310 has a certain flap width in the left-right direction (X-axis direction). The flap body 310 has a certain flap width in the front-rear direction (Y-axis direction).

The flap body 310 has a rotation center axis C1 extending in the left-right direction (X-axis direction). The flap body 310 may perform pitch movement around the rotation center axis C1.

The rotation center axis C1 may be a virtual component that is a center axis of the pitch movement of the flap body 310.

The rotation center hinge segment 320 is at a front end of the flap body 310.

The rotation center hinge segment 320 has a first hinge axis 322. The first hinge axis 322 may be on the rotation center axis C1. The first hinge axis 322 may be at a position on a chord line L of the flap body 310. As shown in FIG. 2, the chord line means a line connecting front and rear edges of the flap body 310 in a straight line.

The flap body 310 may perform pitch movement around the first hinge axis 322 provided in the rotation center hinge segment 320.

Figure 7:
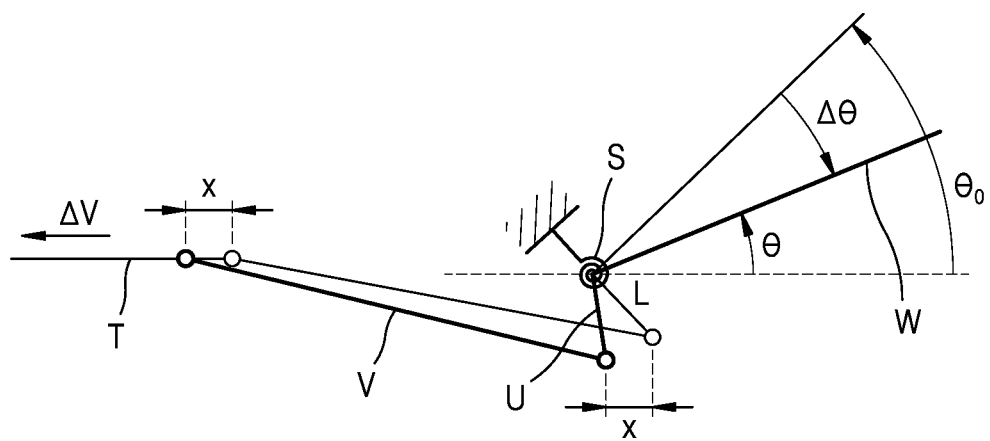
FIG. 7 is a view of a rotorcraft blade to which a flap drive device according to an embodiment is applied.

As shown in FIG. 7, a segment at a front end of the rotation center hinge segment 320 with the first hinge axis 322 as a center may be connected to a blade body 2 of a rotorcraft blade 10. In addition, a segment at a rear end of the rotation center hinge segment 320 may be connected to the flap body 310.

As shown in FIG. 1, there may be a plurality of rotation center hinge segments 320. The plurality of rotation center hinge segments 320 may be arranged by a certain distance in a lateral direction. The first hinge axis 322 provided in each of the rotation center hinge segments 320 is located on the rotation center axis, and may share the rotation center axis.

The flap pivot hinge segment 330 is at the front end of the flap body 310 and is at a different position from the rotation center hinge segment 320.

The flap pivot hinge segment 330 has a second hinge axis 332.

Referring to FIG. 2, when the flap body 310 is viewed in the lateral direction, the first hinge axis 322 and the second hinge axis 332 are at different positions from each other. The different positions may be understood to mean that the first hinge axis 322 and the second hinge axis 332 are not coaxial with each other. For example, the first hinge axis 322 and the second hinge axis 332 may be located with a certain separation distance in the up-down direction (Z-axis direction).

Accordingly, when an external force is applied to the flap body 310 in the front-rear direction through the second hinge axis 332, the flap body 310 may perform pitch movement around the first hinge axis 322.

According to an embodiment, the second hinge axis 332 may be at a center position of a span of the flap body 310 (a center position of a width of the flap body 310 in the left-right direction). Accordingly, when the flap drive link arm 200 applies an external force to the flap body 310 through the second hinge axis 332, the second hinge axis 332 may be prevented from being biased to a position of the flap body 310.

According to an embodiment, a center C2 of the second hinge axis 332 may be apart from a center C1 of the first hinge axis 322 on a line M perpendicular to the chord line L (i.e., in a direction perpendicular to the chord line L) with a certain separation distance T.

The separation distance T may be determined by a required aerodynamic moment size, a dynamic maximum driving force, and a driving stroke size of the actuator 110.

Operation of the Flap Drive Device 1 According to an Embodiment

Figure 3:
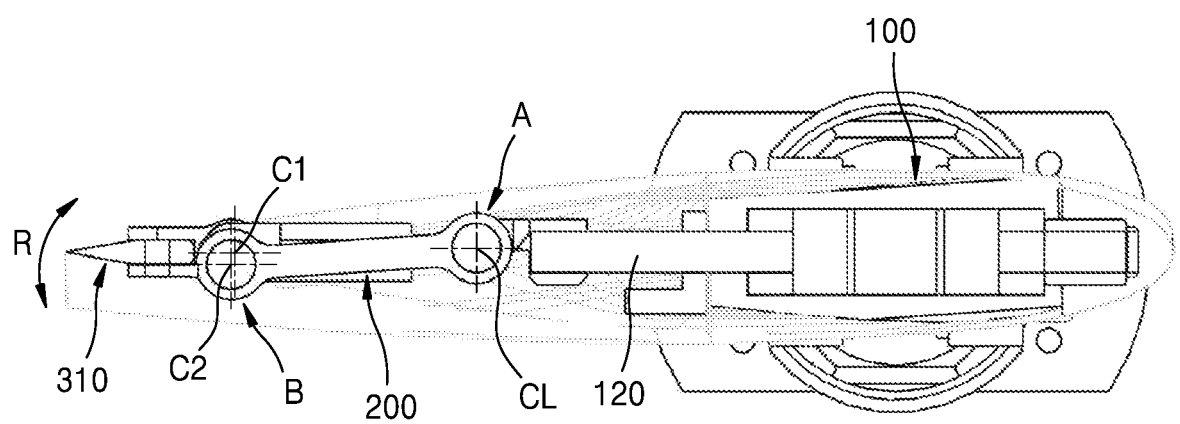
FIG. 3 is a view of a cross-sectional structure of the flap drive device shown in FIG. 1 in an X-axis direction.
Figure 4:
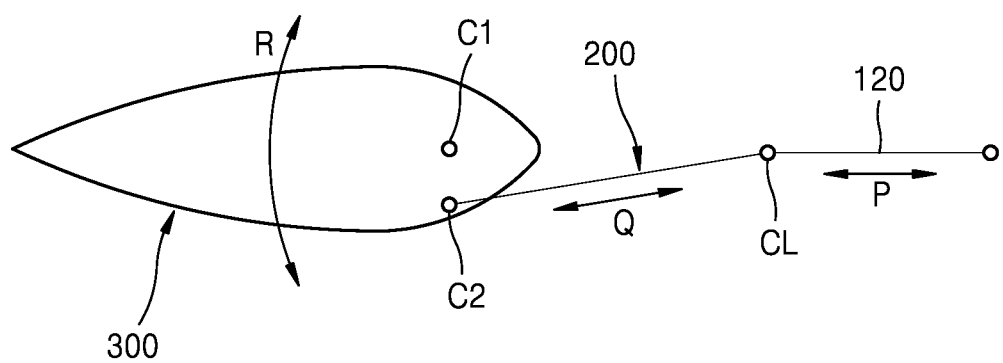
FIG. 4 is a conceptual diagram showing the operation of a flap drive device according to an embodiment.

FIG. 3 is a view of a cross-sectional structure of the flap drive device 1 shown in FIG. 1 in the X-axis direction. FIG. 4 is a conceptual diagram showing the operation of the flap drive device according to an embodiment. Hereinafter, the operation of the flap drive device 1 according to an embodiment will be described with reference to FIG. 4.

The flap drive device 1 according to an embodiment is the flap drive device 1 using a two-section link mechanism. Links constituting the two-section link mechanism are the flap drive link arm 200 and the flap body 310, respectively.

Because front and rear ends of the flap drive link arm 200 are hinge-connected to the actuator shaft 120 and the flap body 310, respectively, it can be said that a first joint A is provided at the front end of the flap drive link arm 200 and a second joint B is provided at the rear end of the flap drive link arm 200. An axis serving as a pivot center of the first joint A is a center CL of the front hinge connection portion 220 of the flap drive link arm 200, and an axis serving as a pivot center of the second joint B is the center C2 of the rear hinge connection portion 230 of the flap drive link arm 200.

When the drive module 100 is operated, the actuator shaft 120 may change its position in the front-rear direction as shown by the arrow P of FIG. 4 by the actuator 110. As the position of the actuator shaft 120 changes in the front-rear direction, the flap drive link arm 200 also has a displacement in the front-rear direction as shown by the arrow Q.

The front end of the flap drive link arm 200 may be hinge-connected to the actuator shaft 120 by the front hinge connection portion 220. Furthermore, the rear end of the flap drive link arm 200 may be hinge-connected to the flap body 310 by the rear hinge connection portion 230. In addition, the flap body 310 may be hinge-connected in a state in which the position of a hinge axis is fixed by the rotation center hinge segment 320.

Accordingly, the change in the position of the actuator shaft 120 in the front-rear direction is converted into pitch movement of the flap body 310 as indicated by the arrow R by the flap drive link arm 200. A center axis of the pitch movement of the flap body 310 becomes the first hinge axis 322 of the rotation center hinge segment 320.

A ratio of a pitch movement angle of the flap body 310 to a change range in the position of the actuator shaft 120 in the front-rear direction may be determined by a length of the flap drive link arm 200 or the separation distance T between the second hinge axis 332 and the first hinge axis 322.

As a result, the flap drive device 1 according to an embodiment may move the flap body 310 by using a position change output of the piezoelectric actuator 110 in the front-rear direction. The position change output of the piezoelectric actuator 110 is transmitted in an amplified state using the two-section link mechanism.

Determination of the Separation Distance T Between the Second Hinge Axis 332 and the First Hinge Axis 322 of the Flap Drive Device 1 According to an Embodiment For example, the separation distance T between the second hinge axis 332 and the first hinge axis 322 of the flap drive device 1 according to an embodiment may be determined by the following mechanism.

Figure 5:
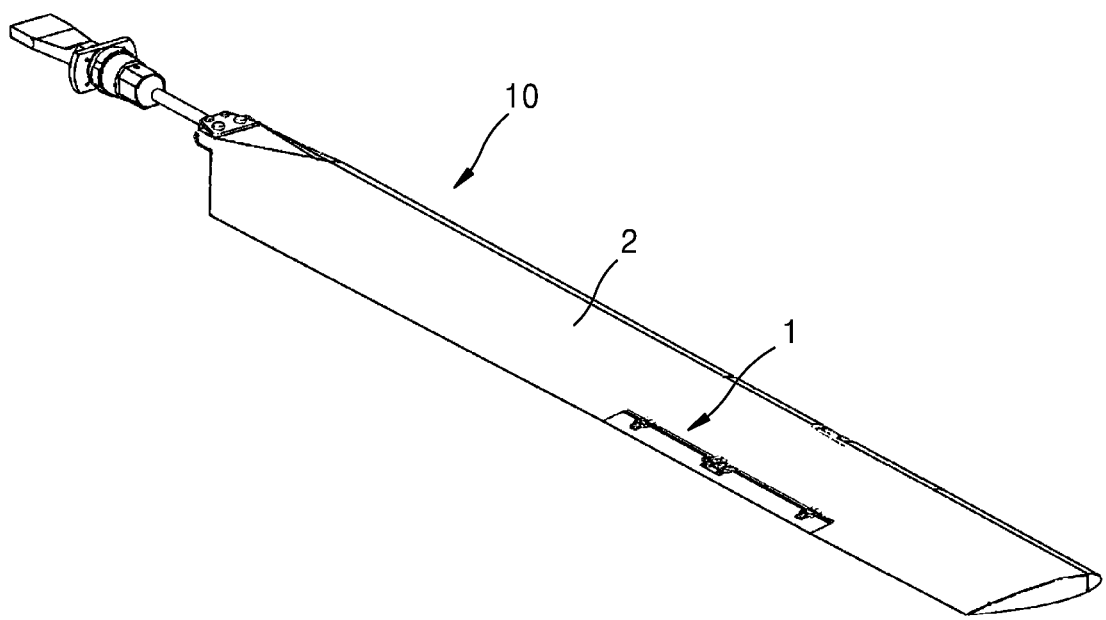
FIG. 5 is a mechanical schematic diagram of a flap drive device according to an embodiment.

First, when the flap drive device 1 according to the disclosure is mechanically schematically illustrated, it is as shown in FIG. 5.

That is, the actuator shaft 120 corresponds to an actuator rod T that changes in position in the front-rear direction, and the flap drive link arm 200 corresponds to a push rod V that is connected to the actuator rod T and rotates. In addition, a moment arm U is provided between an end of the push rod V and a flap W. A length L of the moment arm U is the separation distance T between the second hinge axis 332 and the first hinge axis 322 of the flap drive device 1. In addition, it can be seen that a torsion spring S having a torsion hinge spring coefficient k is provided at a connection portion between the flap W and the moment arm U. This torsion hinge spring factor k is calculated from an aerodynamic pitching moment.

When this is expressed by the formula related to a driving force-driving stroke, it is as shown in Equation 1.

$$\frac{\Delta F}{F_{max}} + \frac{\Delta x}{x_{max}} = \frac{\Delta V}{V_{max}} \quad \text{(Equation 1)}$$

Where $\Delta V$ is an input voltage. $\Delta F$ is a change in the driving force, and $\Delta x$ is a change in the driving stroke. In addition, the subscript max means a maximum value of each variable. That is, $F_{max}$ is a maximum value of the driving force, $x_{max}$ is a maximum value of the driving stroke, and $V_{max}$ is a maximum value of the input voltage.

Figure 6:
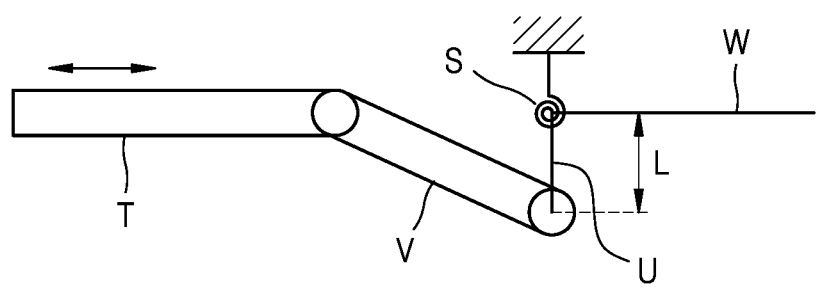
FIG. 6 is a view showing the operation of a mechanism of FIG. 5.

The mechanism operates as shown in FIG. 6. The kinematic operation of this mechanism is given by Equations 2 and 3.

$$\Delta M = -k\Delta\theta \quad \text{(Equation 2)}$$

$$\Delta F = -\frac{k}{L}\Delta\theta \quad \text{(Equation 3)}$$

Where $\Delta M$ is the amount of change in a hinge moment by the torsion spring S. $\Delta\theta$ is the amount of change in a rotation angle of a hinge. Because the amount of change in the hinge moment $\Delta M$ is the product of the length L of the moment arm U and the amount of change in the driving force ΔF, the amount of change in the driving force ΔF is summarized as in Equation 3.

Therefore, driving dynamic equations of the flap W (flap module 300) is as shown in Equations 4 and 5.

$$\frac{-k\Delta\theta}{LF_{max}} + \frac{L(\Delta\theta)}{x_{max}} = \frac{\Delta V}{V_{max}} \quad \text{(Equation 4)}$$

$$\Delta V = V_{max}\left(\frac{-k}{LF_{max}} + \frac{L}{x_{max}}\right)\Delta\theta \quad \text{(Equation 5)}$$

Where θ0 is a setting angle of the flap module 300 in an initial state. In addition, when a stroke of the actuator rod T is +ΔV, the flap 300 operates as much as Δθ with respect to the setting angle of the flap 300 in the initial state in a direction of the arrow of FIG. 6.

Using the above-described operation mechanism, the separation distance T corresponding to a length of the moment arm U may be derived.

Effect of the Flap Drive Device 1 According to an Embodiment

The flap drive device 1 according to an embodiment uses a two-section link mechanism, and a link system having a simple mechanical structure.

The flap drive device 1 according to an embodiment may amplify a small positional change (operation range) of the drive module 100 by a large angular change of the flap module 300.

In addition, the flap drive device 1 according to an embodiment excludes the use of an elastic hinge. Accordingly, the flap drive device 1 may stably secure a desired flap displacement profile in a blade environment where centrifugal force, pneumatic force, and inertia act.

<Rotorcraft Blade to which the Flap Drive Device 1 According to an Embodiment is Applied>

FIG. 7 is a view of a rotorcraft blade to which the flap drive device 1 according to an embodiment is applied.

The flap drive device 1 according to an embodiment may be applied to the rotorcraft blade. For example, the flap drive device 1 according to an embodiment may be applied to an active trailing-edge flap provided on a trailing edge of the blade body 2 of the rotorcraft blade 10.

When the flap drive device 1 according to an embodiment is applied to an active trailing-edge flap of the rotorcraft blade 10, the operation of the active trailing-edge flap may be effectively control with a small driving force.

In addition, because the flap drive device 1 according to an embodiment excludes the use of an elastic hinge, the flap drive device 1 may stably secure a desired displacement profile of an active flap continuously in a blade environment where centrifugal force, pneumatic force, and inertia act.

A flap drive device according to an embodiment uses a two-section link mechanism, and a link system having a simple mechanical structure.

A flap drive device according to an embodiment may amplify a small positional change (operation range) of a drive module by a large angular change of a flap module.

In addition, a flap drive device according to an embodiment excludes the use of an elastic hinge. Accordingly, the flap drive device may stably secure a desired flap displacement profile in a blade environment where centrifugal force, pneumatic force, and inertia act.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A flap drive device installed on a blade body of a rotorcraft, the flap drive device comprising:
   a drive module;
   a flap drive link arm arranged behind the drive module and extending by a length in a front-rear direction; and
   a flap module arranged behind the flap drive link arm and capable of performing a pitch movement around a rotation center axis,
   wherein the drive module comprises an actuator shaft capable of changing a position thereof in the front-rear direction,
   wherein the flap drive link arm comprises a front hinge connection portion provided at a front end of the flap drive link arm and a rear hinge connection portion provided at a rear end of the flap drive link arm,
   the front hinge connection portion is pivotably-connected to the actuator shaft to pivot about an axis,
   the rear hinge connection portion is pivotably-connected to the flap module;
   the flap module comprising:
   a flap body;
   a rotation center hinge segment at a front end of the flap body; and
   a flap pivot hinge segment at the front end of the flap body,
   wherein the rotation center hinge segment connects a rotorcraft blade to the flap body,
   the flap pivot hinge segment hinge-connects the rear hinge connection portion of the flap drive link arm to the flap body,
   the rotation center hinge segment has a first hinge axis on the rotation center axis of the flap module,
   the flap pivot hinge segment has a second hinge axis,
   the first hinge axis is at a position on a chord line of the flap body, the second hinge axis aligned with the first hinge axis on a line perpendicular to the chord line, and
   a center of the first hinge axis and a center of the second hinge axis are apart from each other by a distance,
   wherein when a position of the actuator shaft changes in the front-rear direction, the flap module performs the pitch movement around the rotation center axis.

2. A rotorcraft blade comprising:
   the flap drive device of claim 1; and
   a blade body provided with the flap drive device.

3. The flap drive device of claim 1, wherein the second hinge axis is at a center of a span of the flap body.

4. A rotorcraft blade comprising:
   the flap drive device of claim 3; and
   a blade body provided with the flap drive device.

* * * * *